(12) United States Patent
Zupancic et al.

(10) Patent No.: US 12,450,533 B2
(45) Date of Patent: Oct. 21, 2025

(54) SYSTEMS AND METHODS FOR CELLULAR TELECOMMUNICATION SITE TASK MANAGEMENT

(71) Applicant: DISH Wireless L.L.C., Englewood, CO (US)

(72) Inventors: Alexia Zupancic, Springfield, VA (US); Craig Lincoln Krammes, Highland, MD (US)

(73) Assignee: DISH WIRELESS L.L.C., Englewood, CO (US)

( * ) Notice: Subject to any disclaimer, the term of this patent is extended or adjusted under 35 U.S.C. 154(b) by 690 days.

(21) Appl. No.: 17/549,723

(22) Filed: Dec. 13, 2021

(65) Prior Publication Data

US 2023/0186204 A1 Jun. 15, 2023

(51) Int. Cl.
*G06Q 10/06* (2023.01)
*G06Q 10/0631* (2023.01)

(52) U.S. Cl.
CPC . *G06Q 10/06312* (2013.01); *G06Q 10/06315* (2013.01); *G06Q 10/06316* (2013.01)

(58) Field of Classification Search
None
See application file for complete search history.

(56) References Cited

U.S. PATENT DOCUMENTS

| | | | | |
|---|---|---|---|---|
| 5,920,846 A | * | 7/1999 | Storch | H04M 3/22 379/27.01 |
| 9,552,226 B1 | * | 1/2017 | Norbeck, Jr. | G06Q 10/06313 |
| 2003/0101085 A1 | * | 5/2003 | Butler, III | G06Q 10/10 705/7.38 |
| 2014/0304001 A1 | * | 10/2014 | Lee | G16H 40/20 705/3 |
| 2021/0181762 A1 | * | 6/2021 | Zhao | G08G 1/202 |
| 2021/0248539 A1 | * | 8/2021 | McAlpine | G06F 3/04847 |
| 2021/0342785 A1 | * | 11/2021 | Mann | G06F 40/186 |

* cited by examiner

*Primary Examiner* — Alan Torrico-Lopez
(74) *Attorney, Agent, or Firm* — Seed Intellectual Property Law Group LLP

(57) ABSTRACT

A site task management system generates task lists which assist users in acquiring cellular telecommunication sites for a network provider. The site task management system receives an indication of one or more cellular telecommunication sites and one or more users. The site task management system identifies completed tasks and incomplete tasks for each cellular telecommunication site, assigns a priority to incomplete tasks, and assigns the incomplete tasks to a user. The site task management system generates a task list for each user based on the incomplete tasks and the assigned priority for each incomplete task assigned to the user, and causes the task list to be presented to a user, such that the tasks in the task list are not presented to at least one other user.

18 Claims, 8 Drawing Sheets cellular telecommunication site tasks data table

| Site ID | Task | Priority | Task Completed? |
|---------|------|----------|-----------------|
| Site 1 | Review Building Permit | 1 | No |
| Site 1 | Review Zoning Drawings | 3 | Yes |
| Site 2 | Perform Drone Site Inspection | 2 | Yes |
| Site 2 | Review Lease Package | 1 | Yes |
| ... | ... | ... | ... |

*Fig. 3*

SYSTEMS AND METHODS FOR CELLULAR TELECOMMUNICATION SITE TASK MANAGEMENT

BRIEF SUMMARY

Cellular telecommunication sites are used to house telecommunication equipment, including network infrastructure components used to provide service to network customers. The process of acquiring cellular telecommunication sites ("sites") and preparing them to house telecommunication equipment includes hundreds of tasks. Each task may depend on the completion of one or more other tasks, require information from a third party or vendor system, etc. Members of a site acquisition team must therefore manually keep track of the status of each task, interface with vendors to determine whether vendor tasks are complete, etc., in order to ensure that a site is acquired. Additionally, before beginning a task, a site acquisition team member must additionally manually access reports to determine which tasks have been already been performed, and then manually determine which task must be performed next. Because some tasks must be performed in a certain order, this process may lead to members of the team performing the tasks out of order. Furthermore, there may be other tasks which can be performed that the team member overlooks, multiple team members performing the same tasks, or other inefficiencies which may cause a delay in the acquisition of the site.

The embodiments disclosed herein address the issues above and thus help solve the above technical problems and improve the technology of cellular telecommunication site acquisition by providing a technical solution that determines which tasks must be performed for a plurality of sites and generates a list of tasks for each of a plurality of team members to perform. Additionally, the embodiments disclosed herein are further able to connect to vendor systems to determine whether tasks assigned to the vendor have been completed. Furthermore, the embodiments disclosed herein are able to ensure that each generated task list is accessible to a limited number of team members in order to ensure that tasks are not performed multiple times for the same site.

In some embodiments, a system for cellular telecommunication site task management (a "site task management system") receives an indication of one or more users and an indication of one or more cellular telecommunication sites, identifies completed tasks and incomplete tasks for each cellular telecommunication site, assigns a priority to each incomplete task, assigns each incomplete task to a user, generates a task list for each user based on the incomplete tasks assigned to the respective user and the priority assigned to the task, and presents the task list to the user such that another user is unable to view the presented task list. In some embodiments, the site task management system includes a cellular telecommunication site task management data structure which comprises information specifying one or more cellular telecommunication sites, information indicating one or more completed tasks and one or more incomplete tasks for each cellular telecommunication site, information indicating one or more users, and information indicating a priority for one or more tasks.

BRIEF DESCRIPTION OF THE SEVERAL VIEWS OF THE DRAWINGS

FIG. 3 is a table diagram representing a cellular telecommunication site tasks data table, according to various embodiments described herein.

DETAILED DESCRIPTION

Figure 1:
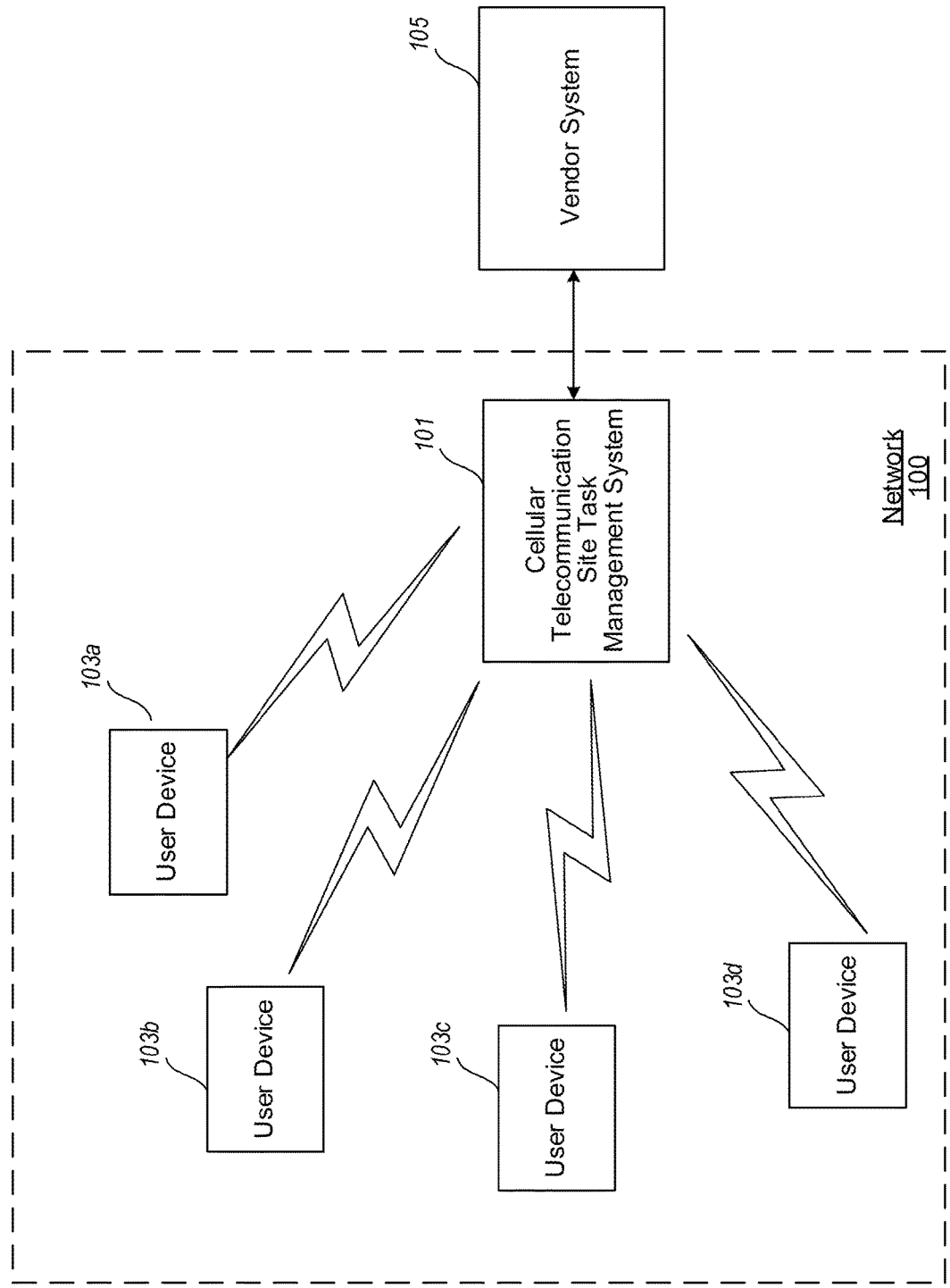
FIG. 1 is a diagram depicting an example environment in which a cellular telecommunication site task management system is implemented.

Network providers, such as cellular network providers, typically contract with or acquire cellular telecommunication sites to house their telecommunication equipment, such as network infrastructure components. Each site must go through a process including hundreds of tasks in order to be acquired, configured, and fully setup to begin housing telecommunication equipment used by the network provider to provide telecommunication and network services to their customers. These tasks range from performing inspections of the sites, acquiring necessary permits, acquiring materials needed to setup the site, interacting with and managing third party contractors or vendors used to prepare the site, perform site evaluations, etc., and other tasks required to ensure that a site is able to house telecommunication equipment for the network provider.

Currently, it is difficult to keep track of which tasks must be completed for site acquisition, as well as determining which stage of acquisition the site is in. Furthermore, it is difficult to determine the most optimal order to perform the tasks, as each task may be dependent on another task, a vendor, or other information, events, or parties. The complexity of the order to perform tasks leads to inefficiencies, such as tasks being performed multiple times, or being skipped or performed out of order, etc. These inefficiencies may lead to delays, tasks being required to be performed again, and other obstacles in acquiring the site.

Furthermore, each team member must manually determine which tasks must be completed by accessing information related to each site and sifting through all of the completed tasks to determine what must still be done for each site. In order to make this determination, the team member must obtain a report for each task performed for a site, and must navigate several user interfaces in order to determine which tasks must be performed for a site. Team members must repeat this process for each task and each site to determine which task they should perform next. Thus, large amounts of computing power and resources are used to generate the user interfaces each time a team member attempts to determine which task must be performed next.

The embodiments disclosed herein help solve the above technical problems and improve the technology of cellular telecommunication site acquisition by providing a technical solution that determines which tasks must be performed for a plurality of sites and generates a list of tasks for each of a plurality of team members to perform. In some embodiments, the site task management system organizes each task in the list of tasks based on a determined priority for the task. In some embodiments, the site task management system prevents at least one other user from viewing the task list generated for a user.

In some embodiments, the priority for an incomplete task is assigned by accessing a priority list which includes one or more priorities for one or more tasks. The priority list may include predetermined, or default, priorities for one or more tasks. The priority for a task may be changed based on which other tasks have been performed for the site, the amount of time the site has been in the process of being acquired, the user being assigned the task, whether a vendor will be assigned to the task, etc. The priority for a task may be changed via user input indicating a new priority and a task. In some embodiments, after the priority for a task is changed, the generated list for a user may also change to reflect the change in priority.

In some embodiments, the site task management system generates a task user interface for a user. The task user interface may present a generated task list to a respective user. The task user interface may be configured such that at least one other user cannot view the task list generated for a user. The task user interface may obtain user input regarding at least one task included in the generated task list. The user input may include input indicating that the task has been completed.

In some embodiments, the site task management system identifies a document for at least one task assigned to a user. The identified document may be a template or other document which assists the user in completing the task. The identified document may be accessed through a task user interface generated for a user. The site task management system may identify the document by accessing a vendor system.

In some embodiments, the site task management system periodically receives an indication of one or more cellular telecommunication sites. In such embodiments, the site task management system may identify incomplete tasks for each of the periodically received cellular telecommunication sites and update the task lists for each user of the one or more users. The updated task lists may be presented to the user via a task user interface.

In some embodiments, the site task management system receives cellular telecommunication site information for each of the one or more cellular telecommunication sites. The cellular telecommunication site information may include information indicating completed tasks for a cellular telecommunication site. The cellular telecommunication site information may include information indicating incomplete tasks for a cellular telecommunication site.

In some embodiments, the site task management system identifies whether a task has been assigned to a vendor. The site task management system may determine that a task has been assigned to a vendor based on the cellular telecommunication site information. The site task management system may receive an indication of whether the task has been completed by the vendor. The site task management system may receive the indication of whether the task has been completed by the vendor from a system operated by the vendor. The site task management system may change the cellular telecommunication site information to indicate that the vendor has completed the task based on obtaining an indication that he task has been completed from the vendor system.

In some embodiments, the site task management system includes a cellular telecommunication site task management data structure. The cellular telecommunication site task management data structure may include information indicating cellular telecommunication site information describing a cellular telecommunication site. The cellular telecommunication site task management data structure may include information indicating one or more users. The cellular telecommunication data structure may include information indicating one or more tasks. The information indicating one or more tasks may include information indicating a priority for at least one task of the one or more tasks. The information indicating one or more tasks may include information indicating when the task is to be performed. The information indicating when the task is to be performed may include information indicating which tasks must be performed before performing the task.

In some embodiments, the cellular telecommunication site task management data structure includes information indicating one or more tasks assigned to a vendor. The cellular telecommunication site task management data structure may include information indicating whether the one or more tasks assigned to the vendor were completed.

Also, the embodiments disclosed herein improve the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by generating a task list for each user, a computer is able to spend fewer resources, such as memory and processing power, on user interfaces used by a user to determine which tasks have been performed for the site and which tasks should be performed next. As another example, by interfacing directly with a vendor system to determine whether the vendor has completed any tasks assigned to them, the site task management system is able to reduce the computing resources used by computing systems of team members and vendors to contact and interface with vendors, such as, for example, user interfaces, to determine whether the vendor has completed their tasks.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/of" unless the content clearly dictates otherwise.

The headings and Abstract of the Disclosure provided herein are for convenience only and do not interpret the scope or meaning of the embodiments.

FIG. 1 is a diagram depicting an example environment in which a cellular telecommunication site task management system is implemented. It is to be appreciated that FIG. 1 illustrates just one example of a network 100 environment and that the various embodiments discussed herein are not limited to the use of such environment. The network 100 includes a cellular telecommunication site task management system ("site task management system") 101 and user devices 103a-103d. The site task management system 101 may communicate with a vendor system 105.

The network 100 is a network, communication system, or networked system (not shown), to which the site task management system 101, user devices 103a-103d, and vendor system 105 may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of endpoint devices are communicatively coupled together. Thus, such a network enables the site task management system 101, user devices 103a-103d, and vendor system 105, used as part of the site task management system, to communicate with each other.

The site task management system 101 generates a task list for team members or users which operate user devices 103a-103d. The site task management system 101 transmits the generated task lists to the user devices 103a-103d.

The user devices 103a-103d may include devices such as cellular telephones, smartphones, tablets, personal computers, laptop computers, wireless peripheral devices such as headphones, microphones, mice, keyboards, etc., Internet of Things (or "smart") devices, televisions, smart televisions, smart television devices—such as FireTV, Roku, AppleTV, etc.,—personal assistant devices—such as Amazon Alexa, Google Home, etc.,—digital assistants, etc. The user devices 103a-103d may interconnect to one or more communications media or sources, such as routers, network switches, modems, etc., to transmit communications to other devices.

The vendor system 105 is a system operated by one or more vendors which are assigned tasks for a cellular telecommunication site. The vendor system 105 may operate outside of the network 100. The one or more vendors may be a third party which is contracted to perform one or more tasks for cellular telecommunication site acquisition.

The above description of the network 100, and the various devices and functions therein, is intended as a broad, non-limiting overview of an example environment in which various embodiments of a cellular telecommunication task management system can operate. The network 100, and the various devices therein, may contain other devices, systems and/or media not specifically described herein. The network 100, and the various functions therein, may contain other functions, systems and/or media not specifically described herein.

Example embodiments described herein provide applications, tools, data structures and other support to implement systems and methods for managing tasks which must be performed in order to prepare cellular telecommunication sites for network infrastructure equipment. The example embodiments described herein additionally provide applications, tools, data structures and other support to implement systems and methods for generating a task list for users which assists users in determining which tasks they must complete in order to prepare the cellular telecommunication sites. Other embodiments of the described techniques may be used for other purposes, including for identifying documents which may be useful to a user in performing the tasks included in the task list. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
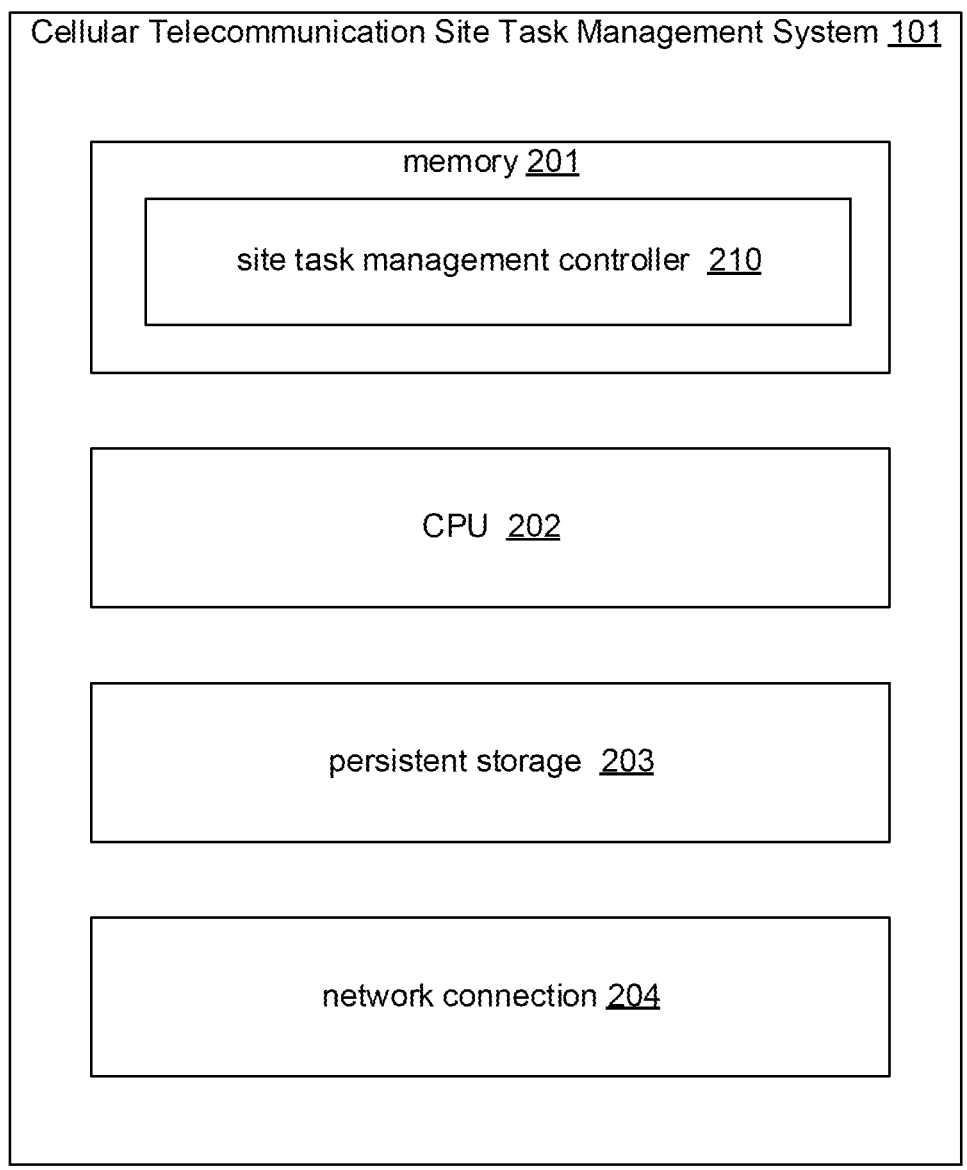
FIG. 2 is a block diagram depicting example components incorporated in a cellular telecommunication site task management system, according to various embodiments described herein.

FIG. 2 is a block diagram depicting example components incorporated in a cellular telecommunication site task management system 101, according to various embodiments described herein. In various embodiments, the cellular telecommunication site task management system 101 includes one or more of the following: a computer memory 201 for storing programs and data while they are being used, including data associated with the cellular telecommunication sites, tasks, user devices 103a-103d, and the cellular telecommunication site task management system 101, an operating system including a kernel, and device drivers; a central processing unit (CPU) 202 for executing computer programs; a persistent storage device 203, such as a hard drive or flash drive for persistently storing programs and data; and a network connection 204 for connecting to one or more computer devices such as the user devices 103a-103d, vendor system 105, and/or other computer systems, to send and/or receive data, such as via the Internet or another network and associated networking hardware, such as switches, routers, repeaters, electrical cables and optical fibers, light emitters and receivers, radio transmitters and receivers, and the like. In various embodiments, the cellular telecommunication site task management system 101 additionally includes input and output devices, such as a keyboard, a mouse, display devices, etc.

While a cellular telecommunication site task management system 101 configured as described may be used in some embodiments, in various other embodiments, the cellular telecommunication site task management system 101 may be implemented using devices of various types and configurations, and having various components. The memory 201 may include a site task management controller 210 which contains computer-executable instructions that, when executed by the CPU 202, cause the cellular telecommunication site task management system 101 to perform the operations and functions described herein. For example, the programs referenced above, which may be stored in computer memory 201, may include or be comprised of such computer-executable instructions. The memory 201 may also include data regarding tasks which must be performed for cellular telecommunication sites and data regarding the prioritization of the tasks.

The site task management controller 210 performs the core functions of the cellular telecommunication site task management system 101, as discussed herein and also with respect to FIGS. 3 through 10. In particular, the site task management controller 210 changes generates optimized task lists for users which indicate to the users which tasks must be performed to acquire a cellular telecommunication site. Additionally, the site task management controller 210 may identify documents and generate user interfaces which assist the user in performing the tasks in the generated task lists. The site task management controller 210 may also interface with vendor systems to determine whether tasks assigned to vendors have been completed.

In an example embodiment, the site task management controller 210 and/or computer-executable instructions stored on memory 201 of the cellular telecommunication site task management system 101 are implemented using standard programming techniques. For example, the site task management controller 210 and/or computer-executable instructions stored on memory 201 of the cellular telecommunication site task management system 101 may be implemented as a "native" executable running on CPU 202, along with one or more static or dynamic libraries. In other embodiments, the site task management controller 210 and/or computer-executable instructions stored on memory 201 of the cellular telecommunication site task management system 101 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the cellular telecommunication site task management system 101.

In addition, programming interfaces to the data stored as part of the site task management controller 210 can be available by standard mechanisms such as through C, C++, C#, Java, and Web APIs; libraries for accessing files, databases, or other data repositories; through scripting languages such as JavaScript and VBScript; or through Web servers, FTP servers, or other types of servers providing access to stored data. The site task management controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of cellular telecommunication site task management system 101, user devices 103*a*-103*d*, and/or vendor system 105.

Furthermore, in some embodiments, some or all of the components/portions of the site task management controller 210, and/or functionality provided by the computer-executable instructions stored on memory 201 of the cellular telecommunication site task management system 101 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PUP, Python, JavaScript, VBScript, and the like) and declarative (e.g., SQL, Prolog, and the like).

FIG. 3 is a table diagram representing a cellular telecommunication site tasks data table 300, according to various embodiments described herein. The cellular telecommunication site tasks data table 300 includes a site ID column 310, a task column 311, a priority column 312, and a task completed column 313. The site ID column 310 includes information used to identify a specific cellular telecommunication site. The task column 311 includes information used to identify a task for a cellular telecommunication site. The priority column 312 includes information used to identify a priority for a task. The task completed column 313 includes information indicating whether a particular task has been completed.

For example, rows 301 and 302 each indicate that "site 1" has tasks which include reviewing building permits and reviewing zoning drawings. Additionally, rows 301 and 302 indicate that the building permit task has a priority of "1" and has not been completed, but the zoning drawings task has a priority of "3" and has not been completed. As can be seen in rows 303 and 304 additional sites may be assigned the same tasks or other tasks, such as performing drone site inspection and reviewing a lease package for the site. The tasks required to obtain and prepare the site for telecommunication equipment may include: reviewing zoning documents, identifying the site, viewing the site in person, reviewing building permits, reviewing documents related to a lease for the site, internal and external reviews of documents, permits, etc., among many other tasks.

Figure 4:
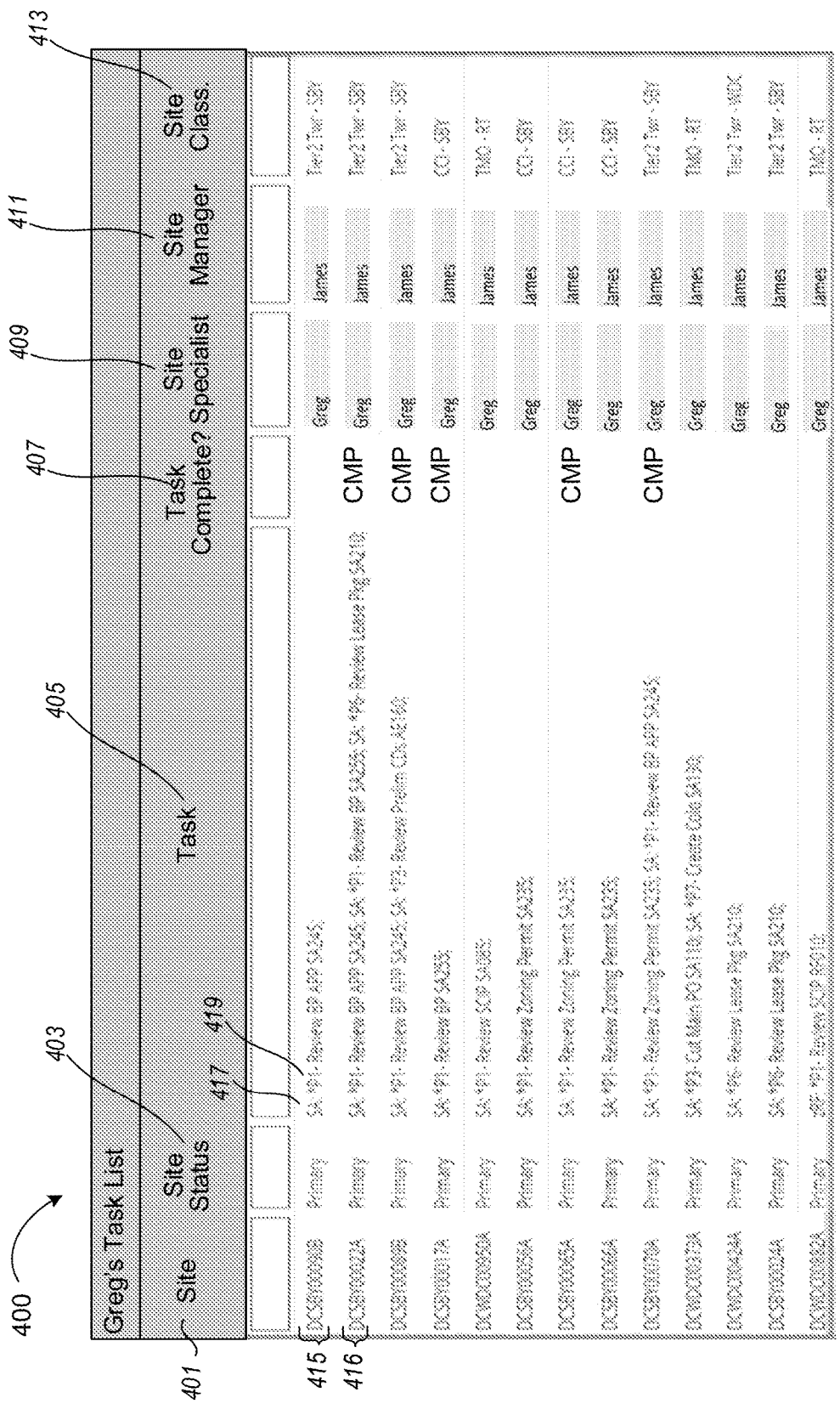
FIG. 4 is a task user interface generated by the task site management system, according to various embodiments described herein.

FIG. 4 is a task user interface 400 generated by the task site management system, according to various embodiments described herein. The task user interface 400 includes a site column 401, a site status column 403, a task column 405, a task complete column 407, a site specialist column 409, a site manager column 411, and a site classification column 413. The site column 401 includes information identifying a site. The site status column 403 includes information identifying the status of the site. The task column 405 includes information identifying the task which is to be performed for the site. The task complete column 407 includes information identifying whether the task is completed. The site specialist column 409 includes information indicating the user, or specialist, assigned to the task for the site. The site manager column 411 includes information indicating the manager for the site. The site classification column 413 includes information indicating the classification of the site, the tower owner, and the geographic area of the site.

The task user interface 400 includes one or more rows, such as row 415 and row 416, which each represent a task in the task list generated for the user. For example, row 415 includes information related to tasks for site "DCSBY00090B." In this example, row 415 indicates that the task is assigned to the site acquisition team, as seen by reference numeral 417 indicating the "SA" in the task column. Additionally, row 415 indicates that this task has a priority of "P1" as seen by reference numeral 419 indicating the "P1" in the task column. Row 415 additionally indicates the type of task assigned to the user in the task column 405, and that the task is not completed in the task complete column 407. As another example, row 416 includes multiple tasks displayed in the task column 405. This indicates to the user that multiple tasks are to be performed for the site indicated by row 416. Furthermore, both rows 415 and 416 indicate that the site is classified as "Tier2 Twr-SBY," which indicates that the site indicated in each of those two rows is a tower ("Twr") owned by Tier2 ("Tier2"), and is located in Salisbury, Maryland ("SBY").

The user may mark a task as completed by interacting with the section for the task complete column 407 in the row for the task. For example, to mark the task indicated in row 415 as complete, the user may interact with a user interface element present in the task complete column 407. When a user interacts with the task column, such as by interacting with a user interface element associated with a task indicated by the task column, the task user interface 400 provides a resource to the user which may be used to complete the task. For example, the task user interface 400 may navigate the user to a different application, a different window, a webpage, present an identified document, or provide other types of resources to a user to assist the user in completing the task.

Figure 5:
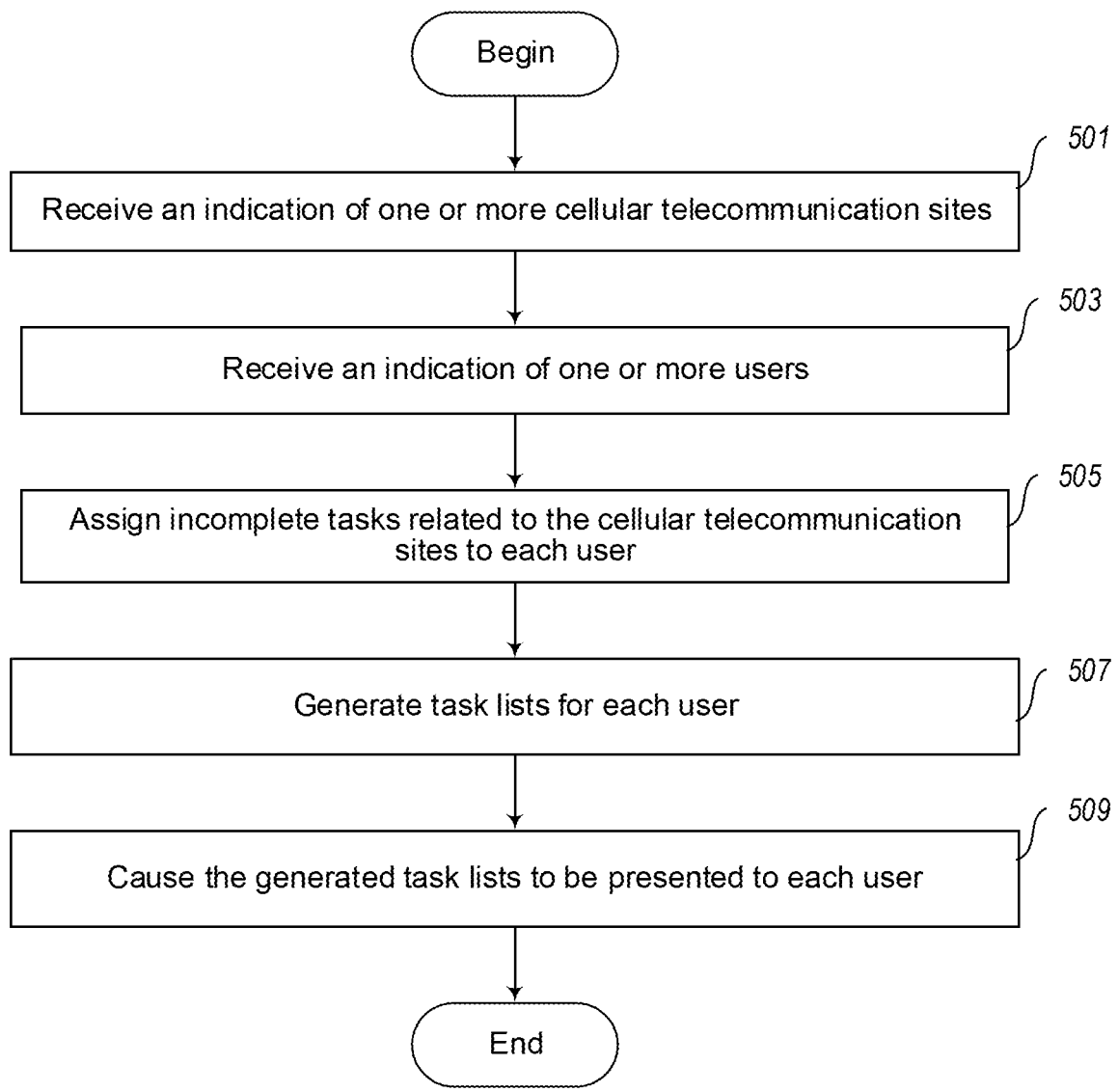
FIG. 5 is a flow diagram depicting a process to generate task lists for users, according to various embodiments described herein.

FIG. 5 is a flow diagram depicting a process to generate task lists for users, according to various embodiments described herein. At act 501, a site task management system receives an indication of one or more cellular telecommunication sites. In some embodiments, the site task management system receives the indication of one or more cellular telecommunication sites from a repository of cellular telecommunication sites. The site task management system may receive the indication of one or more cellular telecommunication sites from user input.

At act 503, the site task management system receives an indication of one or more users. In some embodiments, the indication of one or more users includes information identifying one or more user attributes, such as a group or team which the user is a part of, a status of the user, a specialty of the user, or other user attributes.

At act 505, the site task management system assigns incomplete tasks related to each cellular telecommunication site to each user. The site task management system may perform act 505 by using the process described in FIG. 6 for each cellular telecommunication site.

Figure 6:
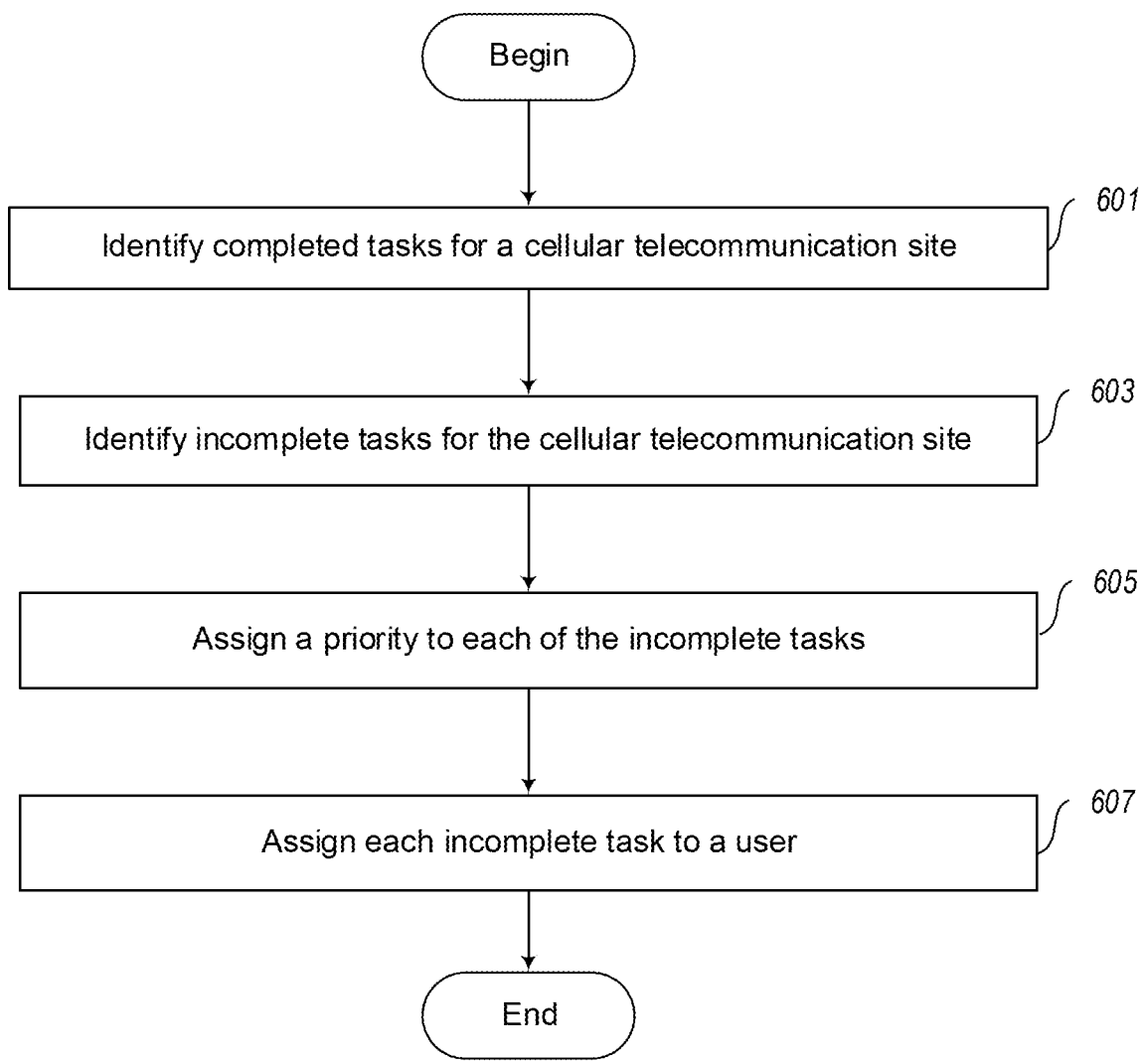
FIG. 6 is a flow diagram depicting a process to assign incomplete tasks for a particular cellular telecommunication site to one or more users.

FIG. 6 is a flow diagram depicting a process to assign incomplete tasks for a particular cellular telecommunication site to one or more users. At act 601, the site task management system identifies completed tasks for a cellular telecommunication site. The site task management system may identify the completed tasks by accessing a repository of tasks for cellular telecommunication sites. At act 603, the site task management system identifies incomplete tasks for the cellular telecommunication sites. The site task management system may identify the incomplete tasks by accessing a repository of tasks for cellular telecommunication sites.

At act 605, the site task management system assigns a priority to each of the incomplete tasks. The site task management system may determine the priority to assign to an incomplete task by accessing a repository of predetermined priorities for tasks. The site task management system may determine the priority to assign an incomplete task based on the completed tasks for the site. The site task management system may determine the priority to assign an incomplete task based on attributes of the user which will be assigned the task.

In some embodiments, the site task management system may receive user input indicating a new priority for a task. The site task management system may alter the priority for the task based on the received user input.

At act 607, the site task management system assigns each incomplete task to a user. The site task management system may assign an incomplete task to a user based on one or more of: one or more attributes of the user, one or more attributes of the task, a priority for the task, one or more completed tasks, and other factors which may be relevant in assigning an incomplete task to a user. For example, a task for reviewing a lease for a property may be dependent on multiple other tasks, such as identifying the party which owns the property to be leased, viewing the property in person or via drone, determining what type of equipment will be stored at the property and how the equipment will be stored, among other tasks. Thus, if the party which owns the property is identified and the type of equipment to be stored at the property has been determined, but the property has not yet been viewed, the site task management system may not assign reviewing the lease for the property to the user. In another example, the site task management system may assign reviewing the lease to the user, but assign it a lower priority, prevent the task from being marked as complete, or take other actions, until the task of viewing the property has been completed.

In some embodiments, at act 607, the site task management system identifies a task as a task which must be performed by a vendor. In such embodiments, the site task management system may transmit an indication to a vendor system that a task is assigned to the vendor. Additionally, in such embodiments, the site task management system may generate a task for a user instructing the user to assign the task to a vendor.

After act 607, the process ends.

Returning to FIG. 5, at act 507, the site task management system generates a task list for each user. In some embodiments, the task list is generated based on the incomplete tasks assigned to the user and the priority for each task assigned to the user. The generated task list may be organized based on one or more of: the priority of each task; attributes of the user, such as a job title, membership in a team or group, expertise that the user has, the user's efficiency with regards to completing certain tasks, or other attributes of a user; and attributes of the site, which may be included in the cellular telecommunication site information for the site, such as how many tasks have been completed for the site, how many tasks are assigned to vendors for the site, a priority assigned to the site, or other attributes of a site.

At act 509, the site task management system causes the task lists to be presented to each user. In some embodiments, the site task management system generates a task user interface used to present the task lists to each user.

In some embodiments, the site task management system performs the process to generate task lists for users periodically.

After act 509, the process ends.

Figure 7:
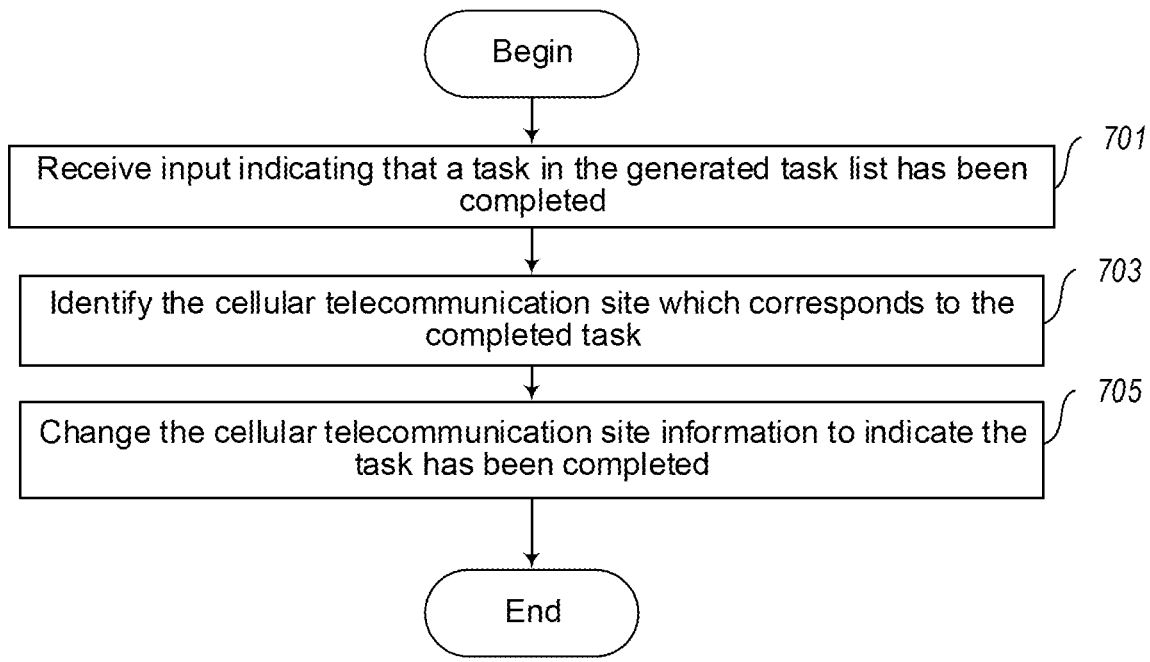
FIG. 7 is a flow diagram depicting a process to receive an indication that a task has been completed, according to various embodiments described herein.

FIG. 7 is a flow diagram depicting a process to receive an indication that a task has been completed, according to various embodiments described herein. At act 701, the site task management system receives input indicating that a task in the generated task list has been completed. The site task management system may receive the input by using a task user interface.

At act 703, the site task management system identifies the cellular telecommunication site which corresponds to the completed task. The site task management system may identify the cellular telecommunication site based on the input received in act 701. At act 705, the site task management system alters the cellular telecommunication site information for the identified cellular telecommunication site to indicate that the task has been completed.

After act 705, the process ends.

Figure 8:
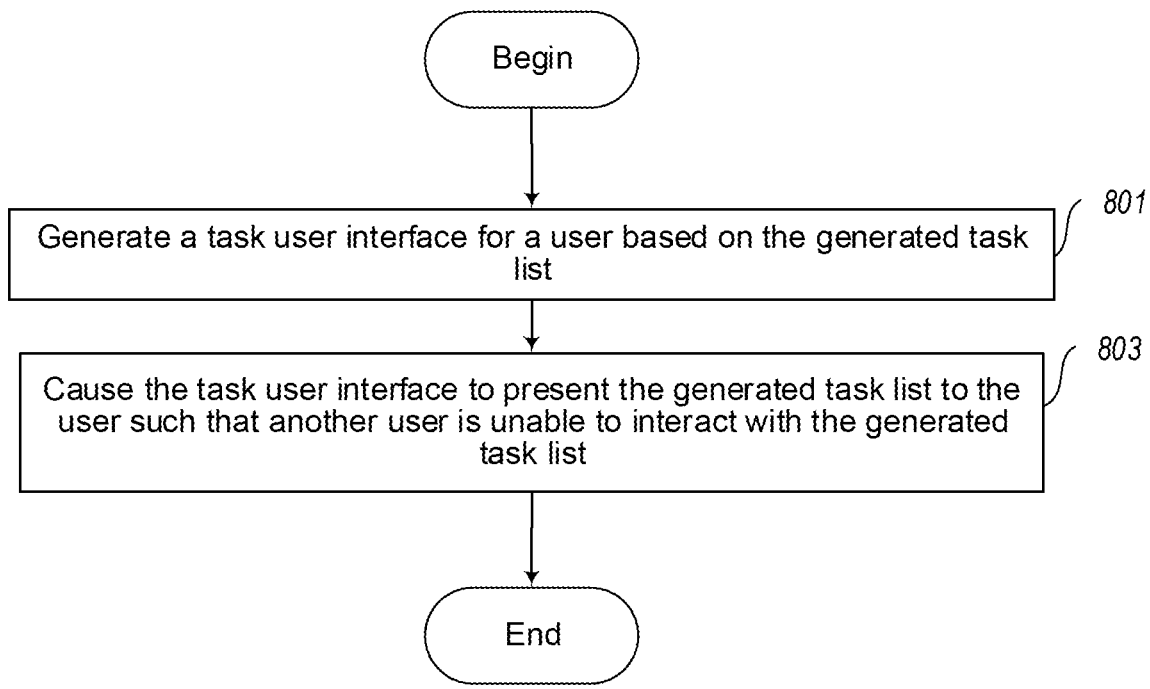
FIG. 8 is a flow diagram depicting a process to cause a task user interface to be displayed to a user, according to various embodiments described herein.

FIG. 8 is a flow diagram depicting a process to cause a task user interface to be displayed to a user, according to various embodiments described herein. At act 801, the site task management system generates a task user interface for a user based on the task list generated for the user. At act 803, the site task management system causes the task user interface to be present the generated task list to the user such that another user is unable to view or interact with the generated task list. In some embodiments, the site task management system may prevent a user from viewing the task list of another user by requiring a user to provide a verification of their identity, such as by requiring a password or another authentication method, before causing the task list to be presented to the user.

After act 803, the process ends.

Figure 9:
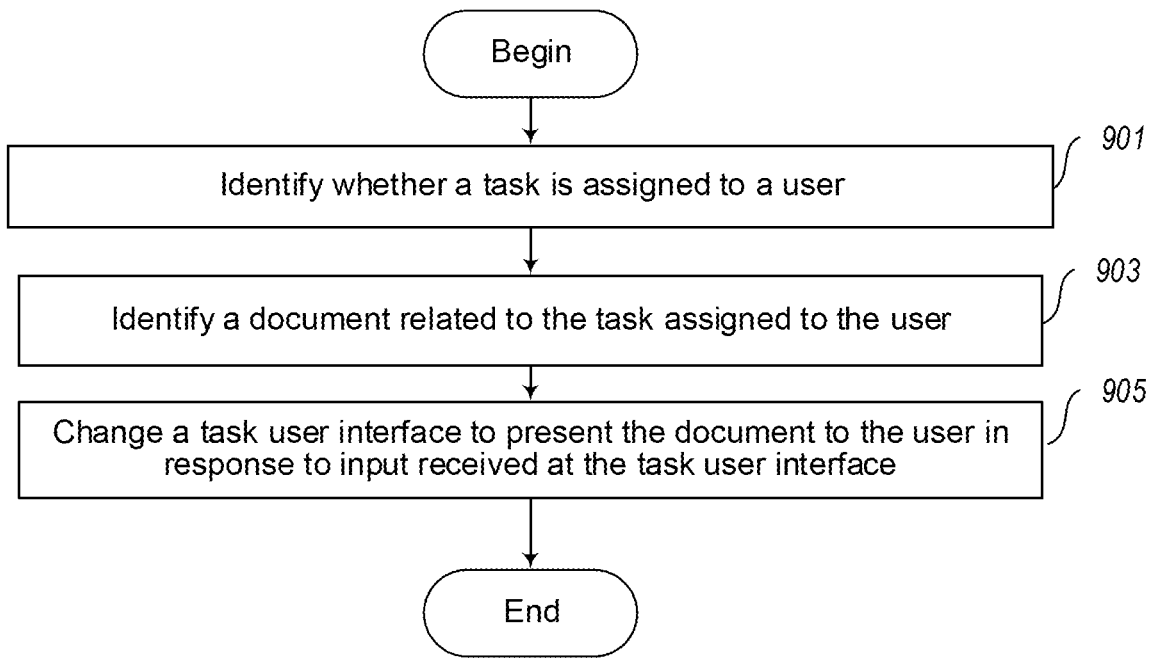
FIG. 9 is a flow diagram depicting a process to identify a document for a task assigned to a user, according to various embodiments described herein.

FIG. 9 is a flow diagram depicting a process to identify a document for a task assigned to a user, according to various embodiments described herein. At act 901, the site task management system identifies whether a task is assigned to a user. At act 903, the site task management system identifies a document related to the task assigned to the user. In some embodiments, the task management system identifies the document by accessing a vendor system.

At act 905, the site task management system changes a task user interface generated for the user to present the document to the user in response to input received at the task user interface. In some embodiments, at act 903, the site task management system identifies a resource, such as a webpage, application, or other resource, which is related to the task assigned to the user.

After act 903, the process ends.

Figure 10:
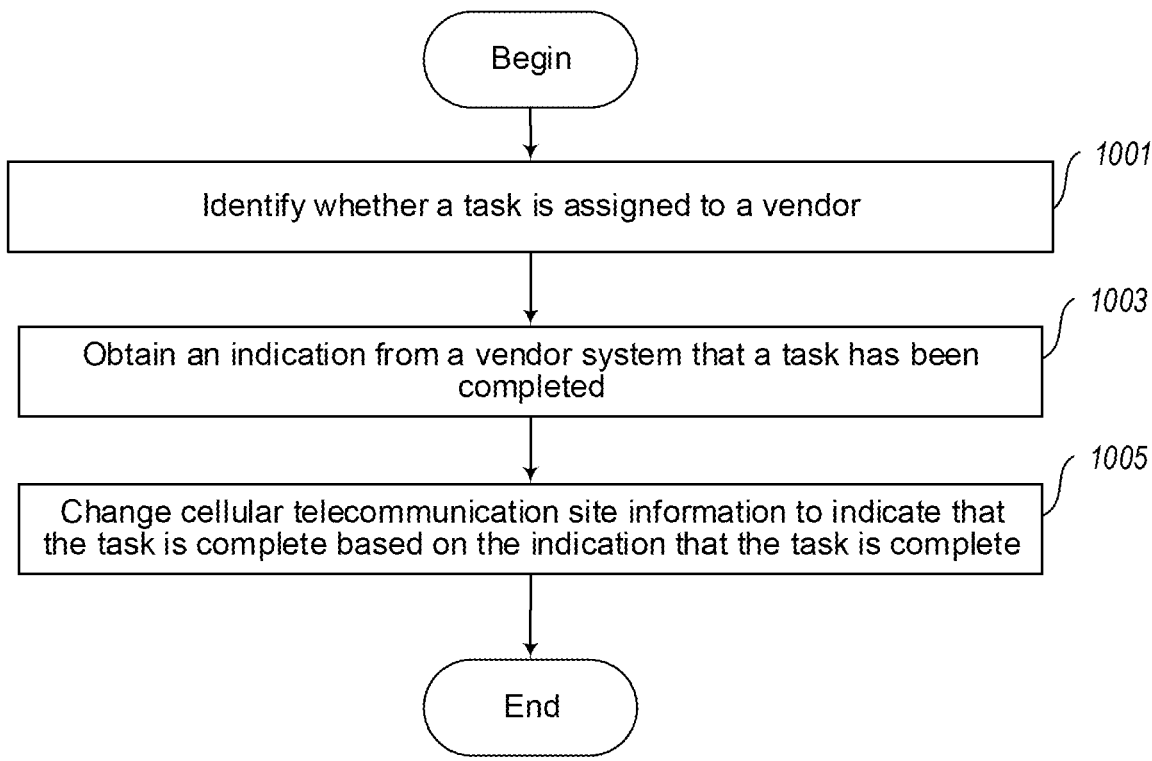
FIG. 10 is a flow diagram depicting a process to interact with a vendor system to determine whether a vendor has completed a task, according to various embodiments described herein.

FIG. 10 is a flow diagram depicting a process to interact with a vendor system to determine whether a vendor has completed a task, according to various embodiments described herein. At act 1001, the site task management system identifies whether a task is assigned to a vendor. At act 1003, the site task management system receives an indication from a vendor system belonging to the vendor that the task has been completed. At act 1005, the site task management system changes cellular telecommunication site information for a cellular telecommunication site associated with the task to indicate that the task has been completed based on an indication that the vendor has completed the task. In some embodiments, based on an indication that the vendor has not completed the task, the task management system indicates to a user, such as by adding a task to the task list, that the vendor has not completed the task. The site task management system may additionally provide a resource to a user related to the vendor, such as generating correspondence to the vendor, displaying contact information for the vendor, etc.

After act 1005, the process ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   at least one processor; and
   at least one memory coupled to the at least one processor, the memory having computer-executable instructions stored thereon that, when executed by the at least one processor, cause the system to:
   electronically receive an indication of one or more cellular telecommunication sites, each indication of a cellular telecommunication site including cellular telecommunication site information;
   electronically receive an indication of one or more users;
   for each cellular telecommunication site of the one or more cellular telecommunication sites:
   electronically identify a plurality of tasks to initially configure the cellular telecommunication site;
   electronically identify, based on the cellular telecommunication site information, one or more tasks of the plurality of tasks to initially configure the cellular telecommunication site that have been completed;

electronically identify, based on the cellular telecommunication site information, one or more tasks of the plurality of tasks to initially configure the cellular telecommunication site that have not yet been completed;

electronically identify at least one vendor associated with at least one task to initially configure the cellular telecommunication site that has not yet been completed;

electronically transmit an indication of the at least one task to the vendor via an application programming interface (API) of the system;

electronically assign a priority for each incomplete task for the respective cellular telecommunication site;

electronically assign each incomplete task to a user of the one or users;

at a first time, for each respective user of the one or more users:

electronically generate a task list for the respective user based on at least: the incomplete tasks assigned to the user and the assigned priority for each incomplete task assigned to the user;

electronically identify one or more resources based on the tasks included in the generated task list, the one or more resources including at least one of: a document associated with an incomplete task included in the generated task list and a user interface associated with an incomplete task included in the generated task list, wherein the one or more resources are related to one or more tasks included in the generated task list;

electronically generate one or more user interface elements and associate the one or more user interface elements with at least one task based on the generated task list, one or more tasks associated with the cellular telecommunication site, an indication of whether at least one task of the one or more tasks has been completed, and an indication of a user associated with the at least one task of the one or more tasks associated with the cellular telecommunication site;

electronically cause at least one user interface element of the one or more user interface elements to be associated with at least one resource of the one or more resources based on the at least one task associated with the at least one user interface element and the one or more tasks to which the at least one resource is related;

electronically cause the one or more user interface elements to be presented to the respective user via a user interface based on the assigned priority for each incomplete task included in the generated task list, such that the generated task list is unable to be presented to at least one user which is not the respective user;

electronically detect one or more interactions with the generated task list presented via the user interface, the one or more interactions including at least one interaction with the at least one user interface element; and in response to the detection of the one or more interactions, electronically cause the at least one resource to be presented to the respective user based on the resource and the one or more detected interactions with the at least one user interface element of the one or more user interface elements to which the one or more resources are related via the user interface by causing the system to:

execute an application associated with the resource;

launch a web browser to display a webpage associated with the resource;

launch a new window associated with the resource; or select a window associated with the resource, the window having already been launched; and automatically, at a second time that occurs after the first time:

electronically identify a vendor associated with at least one incomplete task;

electronically access a computer system associated with the vendor via the API;

electronically obtain, via the API, an indication of whether the at least one incomplete task has been completed from the computer system associated with the vendor;

based on an indication that the at least one incomplete task has not been completed, electronically cause at least one resource associated with the vendor to be presented via the user interface to a user associated with the at least one incomplete task; and based on an indication that the at least one incomplete task has been completed, electronically indicate to at least one user via the user interface that the at least one incomplete task has been completed.

2. The system of claim 1, wherein assigning the priority for each incomplete task for the respective cellular telecommunication site further comprises:

electronically accessing a priority list, the priority list including one or more predetermined priorities for one or more tasks.

3. The system of claim 2, wherein assigning the priority for each incomplete task for the respective cellular telecommunication site further comprises:

electronically receiving user input indicating a priority and a task; and electronically changing the priority list based on the user input indicating a priority and a task.

4. The system of claim 1, to identify one or more resources based on the generated task list, wherein the computer-executable instructions further cause the at least one processor to, for each user of the one or more users:

electronically generate a task user interface configured to:

electronically present the generated task list to the respective user, such that at least one other user is unable to interact with the generated task list; and electronically obtain user input from a user regarding at least one task included in the generated task list.

5. The system of claim 1, wherein the computer-executable instructions further cause the at least one processor to:

electronically receive input from the respective user indicating that a task in the generated task list has been completed;

electronically identify the cellular telecommunication site which corresponds to the task which has been completed; and electronically change the cellular telecommunication site information to indicate that the task has been completed.

6. The system of claim 1, wherein the system periodically receives an indication of one or more cellular telecommunication sites.

7. The system of claim 1, wherein the cellular telecommunication site information for a cellular telecommunication site includes information indicating completed tasks for the cellular telecommunication site and incomplete tasks for the cellular telecommunication site.

8. The system of claim 1, wherein the computer-executable instructions further cause the at least one processor to:
electronically identify, based on the cellular telecommunication site information, whether a task has been assigned to a vendor;
electronically obtain, from a system operated by the vendor, an indication of whether the task has been completed; and
electronically change the cellular telecommunication site information to indicate that the task assigned to the vendor has been completed.

9. A method in a cellular telecommunication site task management system, the method comprising:
receiving an indication of one or more cellular telecommunication sites, each indication of a cellular telecommunication site including cellular telecommunication site information;
receiving an indication of one or more users;
for each cellular telecommunication site of the one or more cellular telecommunication sites:
identifying, based on the cellular telecommunication site information, one or more completed tasks for the respective cellular telecommunication site, the one or more completed tasks being tasks to initially configure the cellular telecommunication site that have been completed;
identifying, based on the cellular telecommunication site information and the one or more completed tasks, one or more incomplete tasks for the respective cellular telecommunication site, the one or more incomplete tasks being tasks to initially configure the cellular telecommunication site that have not yet been completed;
assigning a priority for each incomplete task for the respective cellular telecommunication site;
assigning each incomplete task to a user of the one or users;
identifying a vendor associated with at least one incomplete task of the one or more incomplete tasks; and
transmitting an indication of the at least one incomplete task to the vendor via an application programming interface (API) of the cellular telecommunication site task management system; and
at a first time, for each user of the one or more users:
generating a task list for the respective user based on at least: the incomplete tasks assigned to the user; and
identifying one or more resources based on the tasks included in the generated task list, the one or more resources including at least one of: a document associated with an incomplete task included in the generated task list and a user interface associated with an incomplete task included in the generated task list, wherein the one or more resources are related to one or more tasks included in the generated task list;
generating one or more user interface elements and associate the one or more user interface elements with at least one task based on the generated task list, one or more tasks associated with the cellular telecommunication site, an indication of whether at least one task of the one or more tasks has been completed, and an indication of a user associated with the at least one task of the one or more tasks associated with the cellular telecommunication site;
causing at least one user interface element of the one or more user interface elements to be associated with at least one resource of the one or more resources based on the at least one task associated with the at least one user interface element and the one or more tasks to which the at least one resource is related;
causing the one or more user interface elements to be presented to the respective user via a user interface, such that the generated task list is unable to be presented to at least one user which is not the respective user;
detecting one or more interactions with the generated task list presented via the user interface, the one or more interactions including at least one interaction with the at least one user interface element; and
causing the at least one resource to be presented to the respective user based on the resource and the one or more detected interactions with the at least one user interface element of the one or more user interface elements to which the one or more resources are related via the user interface by:
executing an application associated with the resource;
launching a web browser to display a webpage associated with the resource;
launching a new window associated with the resource; or
selecting a window associated with the resource, the window having already been launched; and
automatically, at a second time that occurs after the first time:
identifying a vendor associated with at least one incomplete task;
accessing a computer system associated with the vendor via the API of the cellular telecommunication site task management system;
obtaining, via the API of the cellular telecommunication site task management system, an indication of whether the at least one incomplete task has been completed from the computer system associated with the vendor;
indicating to at least one user that the at least one incomplete task has been completed based on an indication that the at least one incomplete task has been completed; and
causing at least one resource associated with the at least one incomplete task to be presented to the user via the user interface based on an indication that the at least one incomplete task has not been completed.

10. The method of claim 9, wherein assigning the priority for each incomplete task for the respective cellular telecommunication site further comprises:
accessing a priority list, the priority list including one or more predetermined priorities for one or more tasks.

11. The method of claim 9, wherein assigning the priority for each incomplete task for the respective cellular telecommunication site further comprises:
receiving user input indicating a priority and a task; and
changing the priority list based on the user input indicating a priority and a task.

12. The method of claim 9, further comprising periodically receiving an indication of one or more cellular telecommunication sites.

13. The method of claim 9, further comprising:
for each task in the generated task list:
identifying at least one document for the respective task, the at least one document being usable by the user to complete the task.

14. The method of claim 9, further comprising:
for each user of the one or more users:
generating a task user interface configured to:
presenting the generated task list to the respective user, such that at least one other user is unable to interact with the generated task list; and
obtaining user input from a user regarding at least one task included in the generated task list.

15. One or more storage devices collectively storing a cellular telecommunication site task management data structure for access and processing by a program executed by at least one computer processor that, when accessed and processed by at least one computer processor, functionally enables the at least one computer processor to:
identify one or more incomplete tasks for each cellular telecommunication site of one or more cellular telecommunication sites; and
generate a task list for a user, the cellular telecommunication site task management data structure comprising:
information specifying the one or more cellular telecommunication sites;
for each cellular telecommunication site of the one or more cellular telecommunication sites:
information indicating cellular telecommunication site information, the cellular telecommunication site information comprising:
one or more completed tasks, the one or more completed tasks being tasks to initially configure the cellular telecommunication site that have been completed; and
one or more incomplete tasks, the one or more incomplete tasks being tasks to initially configure the cellular telecommunication site that have not yet been completed;
information indicating one or more users;
information indicating one or more vendors associated with at least one incomplete task of the one or more incomplete tasks;
information indicating one or more resources related to the one or more incomplete tasks; and
information indicating one or more tasks, the information indicating one or more tasks including information indicating a priority for at least one task of the one or more tasks,
such that the information specifying one or more cellular telecommunication sites and the information indicating one or more users are usable to assign one or more incomplete tasks to one or more users,
such that the information indicating one or more users and the assigned one or more incomplete tasks are usable to generate the task list for the user,
such that an indication of the at least one incomplete task is transmitted to a vendor of the one or more vendors via an application programming interface (API) of the cellular telecommunication site task management system,
such that, at a first time, for each respective user of the one or more users, a task list is generated for the respective user based on at least the incomplete tasks assigned to the respective user,
such that one or more user interface elements are generated and associated with at least one task based on the generated task list, one or more tasks associated with the cellular telecommunication site, an indication of whether at least one task of the one or more tasks has been completed, and an indication of a user associated with the at least one task of the one or more tasks associated with the cellular telecommunication site,
such that at least one user interface element that indicates a task associated with the telecommunication site is associated with a resource related to the task associated with the telecommunication site, and that user interaction with the user interface element causes the resource to be presented,
such that the user interface is presented to the user based on the generated task list,
such that, automatically, at a second time after the first time, a vendor associated with at least one incomplete tasks is identified and a computer system associated with the vendor is accessed via the API to obtain an indication of whether the at least one incomplete task has been completed from the computer system associated with the vendor, and
such that at least one resource associated with the at least one incomplete task is presented to the user via the user interface based on an indication that the at least one incomplete task has not been completed and a detection of a user interaction with the user interface element by executing an application associated with the resources, launching a web browser to display a webpage associated with the resource, launching a new window associated with the resource, or selecting a window associated with the resource.

16. The one or more storage devices of claim 15, wherein the at least one processor is further enabled to:
receive user input indicating a change in a priority for at least one task; and
change the priority for the at least one task based on the user input.

17. The one or more storage devices of claim 15, wherein cellular telecommunication site information further comprises:
information indicating one or more tasks assigned to a vendor; and
information indicating whether the one or more tasks assigned to a vendor have been completed.

18. The one or more storage devices of claim 15, wherein the at least one processor is further enabled to:
for each user of the one or more users:
generate a task user interface configured to:
present the generated task list to the respective user, such that at least one other user is unable to interact with the generated task list; and
obtain user input from a user regarding at least one task included in the generated task list.

\* \* \* \* \*